United States Patent Office 3,511,478
Patented May 12, 1970

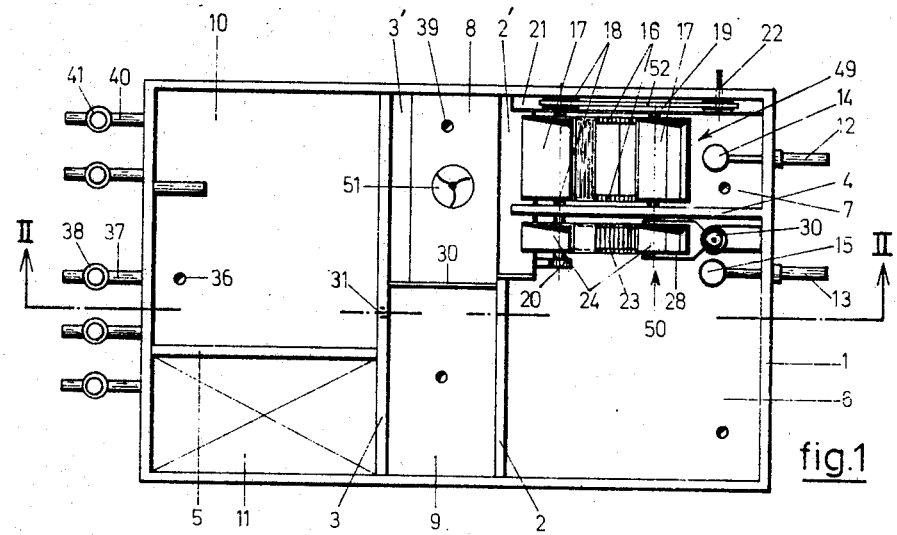
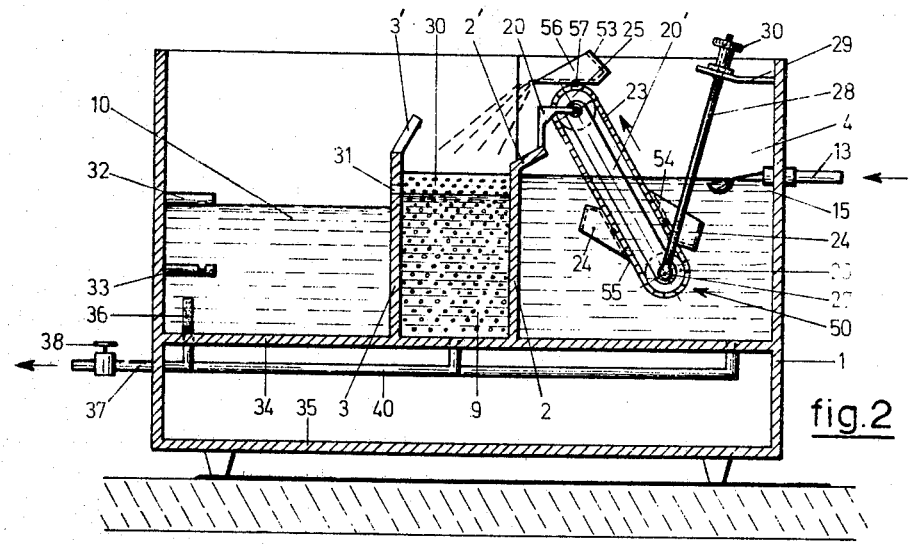
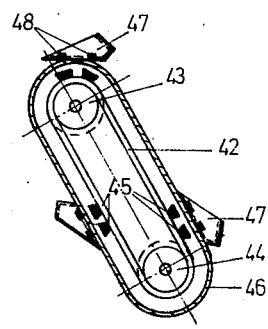

3,511,478
APPARATUS FOR PREPARING AND SUPPLYING A UNIFORM MIXTURE OF TWO OR MORE DIFFERENT LIQUIDS
Hendrik Antoon Lorentz de Haas, Rijksstraatweg 206, Loenersloot, Netherlands
Filed June 20, 1968, Ser. No. 738,711
Claims priority, application Netherlands, June 23, 1967, 6708754
Int. Cl. B01f 7/22, 15/04
U.S. Cl. 259—7                              15 Claims

ABSTRACT OF THE DISCLOSURE

An apparatus for preparing and supplying a mixture of two or more liquids having a liquid reservoir for each liquid and a mixing chamber separated from the reservoirs by a partition wall. An elevator of the bucket-type is partly submerged in each reservoir and extends upwardly towards the top of the partition wall whereby the moving buckets of the elevator can pour their liquid contents, scooped out of the reservoir on their upward movement, across the partition wall into the mixing chamber. The several elevators are simultaneously driven with the same speed, the mixing ratio being determined by the ratio of the holding capacities of the buckets of the respective elevators.

BACKGROUND OF THE INVENTION

The invention relates to an apparatus for preparing and supplying a uniform mixture of two or more different liquids. More in particular, the invention relates to such a mixing apparatus for medical use.

In hospitals it is in many cases required to prepare in a continuous operation a composite liquid by mixing two or more liquid components in an exact and constant mixing ratio. An example thereof is the feeding of an artificial kidney installation with a homogeneous mixture of softened water and a concentrated salt solution. A mixing apparatus for such a purpose should of course be able to operate with a very high degree of reliability and without any possibility of contamination of the mixture to be prepared. For this reason it is desirable that the use of valves, plunger pumps and similar parts having sealing members be reduced as far as possible since seals are susceptible to wear and deterioration especially if the mixing liquids have an aggressive nature or if, as in the case of a concentrated salt solution, salt crystals may be deposited on such seals.

It is accordingly a main object of the invention to provide an apparatus of the character described which is simple of construction and reliable in use. More especially it is an object of the invention to provide such a mixing apparatus which avoids the use of plunger pumps, metering valves and similar equipment as a means for measuring the liquid quantities to be mixed.

A further object of the invention is to provide such a mixing apparatus in which the mixing ratio of the liquids to be mixed can be accurately regulated within the desired limits.

SUMMARY OF THE INVENTION

The apparatus according to the invention generally comprises a separate reservoir for each liquid to be mixed provided with means for maintaining the liquid therein above a minimum level, a mixing chamber for said liquids separated from said reservoirs by a partitioning means having a upper extension, and a number of simultaneously driven bucket-type elevator devices, one arranged inside each reservoir and each comprising at least one bucket having a selected liquid holding capacity, in which each elevator device extends upward from a level below said reservoir minimum liquid level to a level above said partitioning means upper extension and is so arranged that on its operation said bucket is moved to periodically scoop a quantity of liquid out of its reservoir and pour the liquid it has picked up across said partitioning means upper extension into said mixing chamber.

Preferably the several elevator devices have an equal number of buckets and are driven with equal speeds in such a way that they simultaneously empty their respective buckets into said mixing chamber, the ratio of the effective holding capacities of the buckets of the several elevator devices being adapted to the desired mixing ratio of the liquids to be mixed. The buckets of the several elevator devices thus periodically discharge their contents simultaneously into the mixing chamber whereby the liquids to be mixed are fed to this chamber in measured quantities of the correct ratio as determined by the holding capacities of the respective buckets. By arranging each elevator device in an inclined position and by making the angle of inclination of at least one of the elevator devices adjustable, this mixing ratio can be further regulated in a simple manner since the amount of liquid a bucket picks up on being raised out of the body of liquid in the reservoir depends on the angle of inclination of the path of the bucket at its intersection with the surface of the liquid.

The bucket-type elevator device may be of simple construction and may comprise upper and lower guide wheel means and endless conveyor means, such as chains or belts, running on said guide wheel means and carrying said buckets. The several elevator devices are preferably arranged in parallel whereby the upper guide wheel means thereof can be mounted on a common driven shaft extending horizontally across said reservoirs.

BRIEF DESCRIPTION OF THE DRAWING

FIG. 1 is a top view of a preferred embodiment of the mixing apparatus according to the invention;

FIG. 2 is a vertical cross section of the apparatus taken on the line II–II of FIG. 1 and as seen in the direction of the arrows; and FIG. 3 is a vertical sectional view of a modification of the bucket-type elevator device of the apparatus.

DESCRIPTION OF THE PREFERRED EMBODIMENT

The mixing apparatus of FIGS. 1 and 2 of the drawing is intended for preparing and supplying a uniform mixture of two liquid components. More especially the apparatus is intended for feeding an artificial kidney arrangement with a homogeneous mixture of softened water and a concentrated salt solution.

The apparatus of FIGS. 1 and 2 has a rectangular box-like casing 1 with an open top, vertical said walls, an outer bottom wall 35 and an inner bottom wall 34 spaced thereabove. Transverse partition walls 2 and 3 extending across the whole width of the casing and partition walls 4 and 5 divide the interior of the casing into separate compartments 6, 7, 8 and 9, 10, 11, respectively, in the manner as shown in FIG. 1, the compartments 8 and 9 between the transverse walls 2 and 3 being separated by a perforated plate 30.

The compartments 6 and 7 to one side of the transverse wall 2 and separated from one another by the partition wall 4 constitute liquid reservoirs for the two liquids to be mixed. A feed pipe 12 comprising a float-controlled valve 14 opens into the reservoir compartment 7 and a similar feed pipe 13 with a float-controlled valve 15 opens into the reservoir compartment 6 which feed pipes may be connected through flexible conduits with storage tanks for the two liquids (not shown) to be arranged at a higher level than the casing 1. The float-controlled valves 14 and 15 serve in a known manner to maintain the liquids flowing from said storage tanks into the reservoirs 6 and 7, respectively, at a substantially constant level, as shown in FIG. 2. When the apparatus is used as part of an artificial kidney arrangement, softened water is fed through the feed pipe 12 to the reservoir 7 and a concentrated salt solution is fed through the feed pipe 13 to the reservoir 6.

In a manner yet to be described, bucket-type elevator devices generally indicated by 50 and 49, respectively, are used for transferring the liquids in the reservoirs 6 and 7 in the required mixing ratio to the compartment 8 which constitutes a mixing chamber for the liquids. The compartment 8 may be provided in its bottom with a rotating stirring means 51 (FIG. 1) of known type to ensure that the two liquid components are thoroughly and uniformly mixed. The resulting mixed liquid passes through the perforations of the partition plate 30 into the compartment 9 which may serve as a measuring chamber for measuring and checking characteristic properties of the mixed liquid such as the pH value, the density, the conductivity, and the like. The measuring devices for these purposes are not shown in the drawing but may be of any known and conventional type.

An overflow opening 31 is provided in that part of the transverse partition wall 3 separating the compartment 9 from the compartment 10 which overflow opening is arranged at a level below the upper side of the plate 30 and of the transverse walls 2 and 3. The mixed liquid may thus flow through the overflow opening 31 into the compartment 10. The latter compartment serves as a buffer chamber for the liquid from which the latter is fed to the further parts of the artificial kidney arrangement (not shown). To that effect the bottom wall of the compartment 10, forming part of the inner casing bottom 34, has a discharge opening provided with a screen 36 and connected to a discharge pipe 37 which passes through the side wall of the casing 1 below the inner bottom 34 and is provided with a valve 38 outside of the casing. In a similar way drain openings such as 39 are provided in the inner casing bottom 34 opening into the several compartments 6, 7, 8 and 9 for draining said compartments, each drain opening being connected to an individual drain pipe such as 40. As shown, these individual drain pipes run through the space between the inner and outer casing bottom walls 34 and 35, respectively, and pass outward through the side wall of the casing. Outside of the casing each drain pipe is provided with a valve, such as 41.

The compartment 11 has no special function and may be used for instance for storing measuring equipment and the like.

The two bucket-type elevator devices 49 and 50 in the reservoirs 7 and 6, respectively, are arranged generally in parallel on both sides of the partition wall 4 separating the two reservoirs. The elevator device 9 in the reservoir 7 comprises two endless chains 16, which pass around lower chain wheels mounted for rotation on a common horizontal shaft 19 and further pass around upper chain wheels fixedly mounted on a driven shaft 18 which chain wheels are not visible in the drawing. The lower shaft 19 is arranged well below the normal liquid level in the reservoir 7 parallel to and spaced a suitable distance from the transverse wall 2. The shaft 19 is mounted at one end in the partition wall 4 between the reservoirs 7 and 6 and at its other hand in the vertical side wall of a closed housing of a gear case 21 arranged inside the reservoir 7 against the side wall of the casing 1 (FIG. 1). The driven shaft 18 is arranged a suitable distance above the normal liquid level in the reservoir 7 and at a substantially smaller horizontal distance from the transverse partition wall 2 than the lower shaft 19. The chains 16 thus extend in an inclined position between the chain wheels on the shafts 18 and 19, respectively. The driven shaft 18 extends at one end into the gear case 21 where this shaft end is coupled by means of a belt transmission arrangement 52 with a drive shaft 22 which extends outwardly through the casing wall for connection to a suitable drive means, such as an electric motor (not shown). At its other side the driven shaft 18 passes through the partition wall 4 and extends over some distance above the reservoir 6 to a bracket member 20 in which the end of the shaft 18 is rotatably supported. As is shown more clearly in FIG. 2, the partition wall 4 has the same upward extension as the side walls of the casing 1 whereas the transverse walls 2 and 3 have a smaller height. The bracket member 20 extends upwardly from the upper rim of the transverse wall 2.

The chains 16 of the elevator device 49 carry three equally spaced buckets 17 of relatively great width.

The elevator device 50 in the reservoirs 6 comprise a single broad chain 23 passing around two upper chain wheels 25 fixedly mounted on the driven shaft 18 and around two lower chain wheels 26 rotatably mounted on a shaft 27 (FIG. 2). The shaft 27 is mounted in the lower ends of two parallel longitudinal supporting arms 20' (only one of which is visible in FIG. 2) which extends upwardly from the shaft 27 in an inclined position and are at their upper ends pivotally mounted on the shaft 18. A suspension rod 28 has a fork-shaped lower end engaging both ends of the shaft 27 and has a threaded upper end passing through an opening in a bracket 29 and carrying an adjusting nut 30. The bracket 29 is fixedly secured to the casing side wall and supports the nut 30 on its upper side. In the normal position of the elevator device 50 the chain 23 has the same angle of inclination as the chains 16 of the elevator device 49 but by turning the nut 30 in the one or the other direction the lower end of the elevator device 50 can be raised or lowered and thereby its angle of inclination adjusted with respect to the elevator device 49.

The chain 23 carries three equally spaced buckets 24 of relatively small width.

Apart from their difference in width, the buckets 17 and 24 of the two elevator devices have the same configuration. Thus each bucket has a bottom portion 53 of substantially triangular cross-sectional shape, an elongated rear wall 54 which in the scooping position of the bucket (see the right bucket of FIG. 2) extends upwardly to a substantially higher level than the upper rear edge of the bottom portion 53 and terminates in a pouring edge 55, and two side walls 56 each having a straight upper edge extending from the pouring edge 55 to the upper rear edge of the bottom portion 53. The buckets are secured at 57 substantially midway of their rear wall 54 to links of the chains 16 or 23, respectively. The shaft 18 and the chain wheels thereon drive the chains in the direction of the arrow of FIG. 2 whereby the buckets in their inclined upward movement from the lower submerged chain wheels such as 26 to the upper chain wheels such as 25 above the liquid level scoop a predetermined amount of liquid out of the reservoir 6 or 7, respectively, and on reaching the upper chain wheels are gradually tilted to their pouring position (see the upper bucket of FIG. 2) to pour their liquid contents into the mixing chamber 8. Opposite of the two elevator devices the transverse partition wall 2 is provided with an upper extension 2' which is inclined towards the elevator devices. As shown in FIG. 2, in the pouring position of the buckets the forward pouring edges thereof are situated above this partition wall upper extension 2' so that any drops of liquid falling from this pouring edge are caught by the inclined upper extension 2' and flow downward therealong into the mixing chamber. As shown, the transverse partition wall 3 has a somewhat similarly inclined upper extension 3' forming a splash guard for the liquid being poured into the mixing chamber 8.

The upper chain wheels of both elevator devices mounted on the common driven shaft 18 and the lower chain wheels on the shafts 19 and 27, respectively, all have the same diameter and the chains 16 and 23 have the same length and are so adjusted with respect to each other that on operation of the two lifting devices the respective buckets 17 and 24 are moved around by the chains side by side and at intermittent intervals pour their contents simultaneously into the mixing chamber 8. The mixing ratio of the two liquids in this chamber thus remains constant at all times and is determined by the ratio of the liquid holding capacities of the buckets 17 and 24. Since, as above-described, the buckets 17 and 24 have the same configuration in vertical section, this ratio is determined by the ratio of the different widths of the buckets, assuming that the lower chain wheel shafts 19 and 27 are positioned at the same height and thus both devices have the same inclination. The desired mixing ratio of the two liquids may thus be obtained by proper selection of the crosswise dimensions of the buckets 17 and 24 which ratio can be further accurately regulated by adjusting the inclination of the elevator device 50 by means of the nut 30. By turning the nut 30 in a direction so as to raise the lower end of the elevator device 50 the effective holding capacity of the buckets 24 is increased and on turning the nut 30 in the opposite direction so as to lower the elevator device 50 this holding capacity is decreased. The special configuration of the buckets, as above-described, allows in this way an adjustment of the mixing ratio within a sufficient range.

The buffer chamber 10 is preferably provided with a suitable liquid level responsive switching arrangement which controls the operation of the electric motor driving the two elevator devices 49 and 50 through the drive shaft 22. As shown, this switching arrangement may comprise an upper liquid sensitive electrode member 32 and a similar lower electrode member 33 projecting into the buffer chamber 10 which electrode members may be connected in control circuits of known type in such a manner that when during operation of the elevator devices the liquid level in the chamber 10 reaches the electrode member 32 a signal is transmitted which is used to disconnect the electric drive motor from its power source and that when thereupon by reason of a discharge of liquid from this buffer chamber through the discharge pipe 37 the liquid level falls below the lower electrode member 33 a second signal is transmitted causing the electric drive motor to be switched on again. The liquid in the buffer chamber is thus at all times maintained between a predetermined upper and lower level. This liquid level responsive switching arrangement form as such no part of the present invention and, as arrangements of this type are well known in the art, it is believed that it need not be shown and described in detail. Obviously, other known means may be employed to control the operation of the elevator devices in dependence on the amount of liquid delivered by the apparatus. The switching arrangement preferably incorporates suitable means which prevents the electric motor driving the two elevator devices from being switched off as long as any of the buckets 17 and 24 happen to be in their upper pouring position, the stopping of the motor being automatically postponed until such buckets have progressed to a position in which they have completely emptied their contents into the mixing chamber 8.

The buckets 17 and 24 may be made of any suitable plastic material and are preferably removably secured to the chains 16 and 23, respectively, of the two elevator devices. The various parts of these devices should of course be made of materials which are not corroded by the liquids mixed. Generally this will present no great problem. However, in case it is desired that the driving mechanisms of the two elevator devices be completely separated from the liquids in which the devices are submerged, the embodiment schematically shown in FIG. 3 may be employed. The elevator device of FIG. 3 comprises an upper chain wheel 43, a lower chain wheel 44 and an endless chain 42 passing around these chain wheels. The chain 42 has secured thereto three equally spaced pairs of permanent magnets 45 which extend crosswise of the chain. The chain mechanism 42, 43 is arranged inside a shell 46 of a suitable nonmagnetic corrosion resistant material, such as stainless steel. The shell 46 has a smooth outer surface and in its circumferential configuration closely conforms to the path described by the outwardly facing surfaces of the permanent magnets 45 in the operation of the device. The gap between these outer faces of the permanent magnets and the inner surface of the shell 46 is preferably as small as possible. On both sides of the chain mechanism the shell 46 is closed by two side walls (not visible in the drawing) to form a fluidtight casing for this mechanism. Three buckets 47, similar to the buckets 24 of FIG. 2, engage with their rear wall the smooth outer surface of the shell 46 opposite of the three pairs of permanent magnets 45. Each of these buckets 47 is provided in their rear wall with two magnetic parts 48 which cooperate with the pairs of magnets 45. The buckets 47 are thus held against the shell outer surface by the attraction of the magnets 45. When the chain 42 is driven, for instance by rotation of the upper chain wheel 43, the moving magnets 45 carry the buckets along with them about the circumference of the shell 46, the smooth surface of this shell allowing the buckets to slide on this surface. The elevator device of FIG. 3 may, for instance, replace the elevator device 50 of FIGS. 1 and 2 and may be suspended and driven in a similar way as there shown.

If desired, the casing 1 may be closed on its upper side by an airtight cover and a proper connection for a vacuum pump may be provided to allow the creation of a vacuum in the upper part of the casing in order to degas the liquids in the several compartments.

While the invention has been illustrated and described with reference to a specific embodiment thereof it will be understood that other embodiments may be resorted to within the scope of the following claims. For instance, instead of the chain and chain wheel mechanism of the elevator devices 49 and 50, a suitable belt and pulley conveyor mechanism may be employed. Obviously, if more than two liquid components are to be mixed, the number of separate liquid reservoirs and elevator devices should be correspondingly increased. Likewise, the number of buckets of the elevator devices may be selected greater or smaller than three.

I claim:
1. An apparatus for preparing and supplying a uniform mixture of a number of different liquids, comprising a separate reservoir means for each of said liquids to be mixed, liquid level control means for each reservoir means for maintaining the liquid therein above a selected minimum level, a common mixing chamber for said liquids, partitioning means separating said several reservoir means from said mixing chamber and having an upper extension, a number of bucket-type elevator devices, one arranged inside each of said reservoir means and each comprising at least one bucket member having a selected liquid holding capacity, and drive means for simultaneously driving said number of elevator devices, each elevator device extending upwardly from a level below said reservoir minimum liquid level to a level above said partitioning means upper extension and each elevator device being so arranged that on its operation said bucket member thereof is moved to periodically scoop a quantity of liquid out of said reservoir means and to pour the liquid it has picked up across said partitioning means upper extension into said mixing chamber.

2. The apparatus of claim 1 in which each one of said number of elevator devices comprises an equal number of equally spaced bucket members.

3. The apparatus of claim 1 in which said elevator devices have an equal number of bucket members and in which said drive means is arranged to drive said elevator devices with equal speeds and in a manner to cause said elevator devices to simultaneously empty their respective bucket members into said mixing chamber, the ratio of the effective holding capacities of said bucket members of the several elevator devices being adapted to the desired mixing ratio of the liquids to be mixed.

4. The apparatus of claim 3 in which each of said elevator devices extends upwardly in an inclined position, the angle of inclination of at least one of said elevator devices being adjustable.

5. The apparatus of claim 1 further comprising a fluid stirring means arranged in said mixing chamber.

6. The apparatus of claim 1 further comprising a buffer chamber arranged adjacent said mixing chamber, said mixing chamber being provided with an overflow means communicating with said buffer chamber.

7. The apparatus of claim 6 in which said buffer chamber is provided with liquid level responsive means controlling the operation of said drive means for said elevator devices.

8. The apparatus of claim 1 in which said liquid level control means of each reservoir means comprises a liquid feed pipe opening into said reservoir means, valve means in said feed pipe, and second liquid level responsive means in said reservoir means controlling said valve means.

9. The apparatus of claim 8 in which each one of said elevator devices comprises an equal number of bucket members secured in equally spaced positions to said conveyor means.

10. An apparatus for preparing and supplying a uniform mixture of a number of different liquids, comprising a separate reservoir means for each of said liquids to be mixed, liquid level control means for each reservoir means for maintaining the liquid therein above a selected minimum level, a common mixing chamber for said liquids, partitioning means separating said several reservoir means from said mixing chamber and having an upper extension, a number of bucket-type elevator devices, one arranged inside each of said reservoir means and each comprising upper guide wheel means, lower guide wheel means, endless conveyor means running on said upper and lower guide wheel means, respectively, and at least one bucket member secured to said conveyor means and having a selected liquid holding capacity, and drive means for simultaneously driving said number of elevator devices, each elevator device extending upwardly from a level below said reservoir minimum liquid level to a level above said partitioning means upper extension and each elevator device being so arranged that on its operation said bucket member thereof is moved to periodically scoop a quantity of liquid out of said reservoir means and to pour the liquid it has picked up across said partitioning means upper extension into said mixing chamber.

11. The apparatus of claim 9 in which said number of elevator devices are arranged side by side in parallel with one another and in which said upper guide wheel means of said several elevator devices are mounted on a common driven shaft extending horizontally across said number of reservoir means and coupled to said drive means.

12. The apparatus according to claim 11 in which each of said elevator devices extends upwardly in an inclined position and in which at least one of said elevator devices further comprises an elongated supporting member pivotally connected at its upper end to said driven shaft for said upper guide wheel means and supporting at its lower end said lower guide wheel means, said supporting member extending upwardly from said lower guide wheel means to said driven shaft in said inclined position, a suspension member pivotally secured to said supporting member lower end and extending upwardly therefrom, and adjustable holding means for said suspension member arranged above said reservoir minimum liquid level and securing the upper end of said supporting member, whereby said adjustable holding means allows the adjustment of said inclined position of said supporting member.

13. The apparatus of claim 9 in which each bucket member of each of said elevator devices comprises a bottom wall portion having an upper edge, an elongated rear wall portion extending forwardly from said bottom wall portion and terminating in a pouring edge, and side wall portions connected to said bottom wall portion and rear wall portion and having an upper edge extending between said bottom wall portion upper edge and said pouring edge, the arrangement being such that when said bucket member has reached its pouring position at the upper side of the relative elevator device, its pouring edge extends across said partitioning means upper extension.

14. An apparatus for preparing and supplying a uniform mixture of a number of different liquids, comprising a separate reservoir means for each of said liquids to be mixed, liquid level control means for each reservoir means for maintaining the liquid therein above a selected minimum level, a common mixing chamber for said liquids, partitioning means separating said several means from said mixing chamber and having an upper extension, a number of bucket-type elevator devices, one arranged inside each of said reservoir means and each comprising a plurality of bucket members having a selected liquid holding capacity, each elevator device extending upwardly from a level below said reservoir minimum liquid level to a level above said partitioning means upper extension, and drive means for simultaneously driving said number of elevator devices, at least one of said elevator devices comprising upper guide wheel means, lower guide wheel means, an endless conveyor means passing around said upper and lower guide wheel means, respectively, a plurality of permanent magnet means secured in equally spaced relationship to said endless conveyor means so as to be moved around by said conveyor means through a closed path, a shell member enclosing said upper and lower guide wheel means and conveyor means, said shell member having side walls and a circumferential wall conforming in configuration to said path, said shell member forming a liquidtight casing of a suitable corrosion resistant, nonmagnetic material and said circumferential shell wall having a smooth outer surface, said plurality of bucket members being provided with magnetic parts and engaging said outer surface of said circumferential shell wall, one opposite each one of said permanent magnet means, in positions in which said magnetic parts cooperate with said permanent magnet means, whereby on the operation of the elevator device said plurality of bucket members are slidingly carried along by said permanent magnet means about said shell circumferential surface to sequentially scoop a quantity of liquid out of said reservoir means and to pour the picked-up liquid across said partitioning means upper extension into said mixing chamber.

15. The apparatus of claim 14 in which each of said elevator devices extends upwardly in an inclined position, the angle of inclination of at least one of said elevator devices being adjustable.

References Cited

UNITED STATES PATENTS

| | | | |
|---|---|---|---|
| 602,938 | 4/1898 | Gaines | 259—19 |
| 2,660,190 | 11/1953 | Blondel | 259—8 X |
| 2,900,176 | 8/1959 | Krogel | 259—64 X |
| 3,265,365 | 8/1966 | Ward | 259—8 |
| 3,322,402 | 5/1967 | Anders | 259—64 |

ROBERT W. JENKINS, Primary Examiner

U.S. Cl. X.R.

259—23